US010914317B2

(12) United States Patent
Nogamida et al.

(10) Patent No.: US 10,914,317 B2
(45) Date of Patent: Feb. 9, 2021

(54) CENTRIFUGAL FAN

(71) Applicants: MINEBEA MITSUMI Inc., Nagano (JP); TOYOTA BOSHOKU KABUSHIKI KAISHA, Aichi-ken (JP)

(72) Inventors: Wataru Nogamida, Kakegawa (JP); Masaaki Matsubara, Fukuroi (JP); Seiya Fujimoto, Fukuroi (JP); Tetsuya Seki, Fukuroi (JP); Satoshi Hatahara, Yaizu (JP); Kiyohisa Nara, Fukuroi (JP); Atsushi Tsuzaki, Toyota (JP); Yuki Kadono, Toyota (JP); Yuya Makino, Anjo (JP); Hiroshi Murahata, Nisshin (JP)

(73) Assignees: MINEBEA MITSUMI INC., Nagano (JP); TOYOTA BOSHOKU KABUSHIKI KAISHA, Aichi-ken (JP)

( * ) Notice: Subject to any disclaimer, the term of this patent is extended or adjusted under 35 U.S.C. 154(b) by 279 days.

(21) Appl. No.: 15/987,406

(22) Filed: May 23, 2018

(65) Prior Publication Data

US 2019/0003485 A1    Jan. 3, 2019

(30) Foreign Application Priority Data

May 26, 2017  (JP) .................................. 2017-104605
May 29, 2017  (JP) .................................. 2017-105437
May 10, 2018  (JP) .................................. 2018-091413

(51) Int. Cl.
    *F04D 29/42*    (2006.01)
    *F04D 29/02*    (2006.01)
    (Continued)

(52) U.S. Cl.
    CPC ..... *F04D 29/4226* (2013.01); *F04D 25/0606* (2013.01); *F04D 25/068* (2013.01);
    (Continued)

(58) Field of Classification Search
    CPC ............. F04D 25/0606; F04D 25/0613; F04D 25/0646; F04D 25/068; F04D 25/08;
    (Continued)

(56) References Cited

U.S. PATENT DOCUMENTS

2001/0036416 A1 *  11/2001  Obara ................. F04D 25/0633
                                                            417/423.1
2007/0176508 A1    8/2007  Kasai et al.
                   (Continued)

FOREIGN PATENT DOCUMENTS

CN    102678585 A    9/2012
CN    203377708 U    1/2014
                (Continued)

OTHER PUBLICATIONS

Chinese Office Action dated Oct. 11, 2019 for corresponding Chinese Application No. 201810494817.7 and English translation.
(Continued)

*Primary Examiner* — Bryan M Lettman
(74) *Attorney, Agent, or Firm* — Pearne & Gordon LLP

(57) ABSTRACT

A centrifugal fan that is light in weight and has a structure that restrains vibration are provided. The centrifugal fan includes a resin upper casing, a resin lower casing, an impeller, a motor, and a circuit board. The impeller, the motor and the circuit board are housed between the resin upper casing and the resin lower casing. Radial ribs and a concentric ribs for reinforcing are formed at a bottom surface of a concave part of the lower casing. Resin pins are provided in a standing manner at these rib parts, and the circuit board is fixed to the lower casing by the resin pins.

16 Claims, 12 Drawing Sheets

(51) Int. Cl.

| | | |
|---|---|---|
| *F04D 25/06* | (2006.01) | |
| *F04D 29/66* | (2006.01) | |
| *H02K 5/22* | (2006.01) | |
| *H02K 5/24* | (2006.01) | |
| *H02K 7/08* | (2006.01) | |
| *H02K 11/33* | (2016.01) | |
| *H02K 21/22* | (2006.01) | |
| *H02K 5/173* | (2006.01) | |
| *F04D 17/16* | (2006.01) | |
| *H02K 7/14* | (2006.01) | |

(52) U.S. Cl.
CPC ....... *F04D 25/0693* (2013.01); *F04D 29/023* (2013.01); *F04D 29/668* (2013.01); *H02K 5/1732* (2013.01); *H02K 5/225* (2013.01); *H02K 5/24* (2013.01); *H02K 7/083* (2013.01); *H02K 11/33* (2016.01); *H02K 21/22* (2013.01); *F04D 17/16* (2013.01); *F04D 25/0613* (2013.01); *F05D 2250/181* (2013.01); *F05D 2300/44* (2013.01); *H02K 7/14* (2013.01); *H02K 2211/03* (2013.01)

(58) Field of Classification Search
CPC ............... F04D 29/403; F04D 29/4206; F04D 29/4226; F04D 29/441; F04D 25/062; F04D 29/056; F04D 29/0563; F04D 29/059; F04D 29/023; F04D 25/0693; F04D 29/668; F04D 17/16; G06F 1/20; G06F 1/203; H02K 5/225; H02K 5/24; H02K 7/083; H02K 11/33; H02K 21/22; H02K 5/1732; H02K 2211/03; H02K 7/14; F05D 2250/181; F05D 2300/44

See application file for complete search history.

(56) References Cited

U.S. PATENT DOCUMENTS

| | | | |
|---|---|---|---|
| 2012/0230815 A1 | 9/2012 | Teramoto et al. | |
| 2013/0039783 A1* | 2/2013 | Wagner ................. | F04D 29/059 417/313 |
| 2013/0323093 A1 | 12/2013 | Tamaoka et al. | |
| 2014/0186198 A1* | 7/2014 | Oda ...................... | F04D 25/0613 417/354 |
| 2016/0178265 A1* | 6/2016 | Lee ....................... | F25D 17/067 62/419 |
| 2017/0163129 A1* | 6/2017 | Tramet ................... | H05K 7/209 |
| 2017/0163130 A1* | 6/2017 | Tramet ................... | B60R 16/03 |
| 2018/0106259 A1* | 4/2018 | Lin ........................ | H02K 3/522 |

FOREIGN PATENT DOCUMENTS

| | | |
|---|---|---|
| JP | 11-294837 A | 10/1999 |
| JP | H11294837 * | 10/1999 |
| JP | 2011-149440 A | 8/2011 |
| JP | 2014-167304 A | 9/2014 |

OTHER PUBLICATIONS

Chinese Office Action dated May 22, 2020 for corresponding Chinese Application No. 201810494817.7 and English translation.

* cited by examiner

CENTRIFUGAL FAN

TECHNICAL FIELD

The present invention relates to a centrifugal fan.

BACKGROUND ART

A centrifugal fan is known for use as an air blower for cooling, ventilating, and air conditioning of household electrical appliances, office equipment or industrial equipment, or for use for air conditioning and blowing air in vehicles. As a conventional centrifugal fan, a structure is known in which a casing consists of an upper casing and a lower casing, an impeller is housed between the upper and lower casings, and air drawn in from an intake inlet by rotation of the impeller is blown outwardly from a supply outlet formed at a side surface between the upper and lower casings (see Patent Document 1 below).

In the technique disclosed in Patent Document 1 shown in FIG. 16, air which is introduced from the intake inlet 33 passes through between blades 51 of bladed wheel 30, is blown outwardly at the diameter of the bladed wheel 30, and is exhausted from the supply outlet 19 of the casing arranged laterally. The casing consists of a resin upper casing 11 and a metallic lower casing 21, and they are assembled together by using screws 14 at four corners in planar view. The upper casing 11 and the lower casing 21 are mutually engaged with each other while sandwiching a support pillar at the part at which the screw 14 is arranged. The supply outlet 19 is formed between the upper casing 11 and the lower casing 21, at a side part of casing 10, except for a fastened part of the upper casing 11 and the lower casing 21, using the screws 14. A hole part 25 is formed in the lower casing 21, and a connector 71 for supplying electricity to a motor 60 is attached in the hole part 25.

However, since the lower casing 21 functions as a main plate of the bladed wheel 30 in the centrifugal fan disclosed in the Patent Document 1 shown in FIG. 16, accuracy of a gap formed between a lower surface of the blade 51 and the lower casing 21 is important. In this structure, in order to prevent interference of the blade 51 and the lower casing 21, it is necessary that the flatness of the lower casing 21 be highly accurate. Therefore, processing costs for the parts cannot be reduced. Furthermore, since the lower casing 21 is formed of a metallic plate, weight reduction of the centrifugal fan can be adversely effected.

On the other hand, a centrifugal fan shown in FIG. 17 includes a housing 12 in which a casing is formed in a scroll shape, and a yoke 14 which is used for supporting a motor for a rotating fan 22. In the yoke 14, an insert iron plate is integrally formed in the yoke 14 by insert molding. A connector part 42 is also integrally formed with the yoke 14 (see Patent Document 2 below).

It is not clear what material is used for the yoke 14 in the fan motor disclosed in the Patent Document 2 shown in FIG. 17. However, in the fan motor of the Patent Document 2, since the insert iron plate is integrally formed in the yoke 14 by the insert molding, and the connector part is also integrally formed with the yoke 14, it is assumed that the yoke 14 is formed by resin forming.

Patent Document 1: Unexamined Japanese Patent Application, Publication No. 2014-167304

Patent Document 2: Unexamined Japanese Patent Application, Publication No. Heisei 11-294837 [Heisei 11=1999]

SUMMARY OF THE INVENTION

In a case in which the yoke 14 in the fan motor disclosed in the Patent Document 2 is formed by resin forming, thickness of the yoke 14 cannot be thin. Conversely, in a case in which thickness of the yoke 14 is thin, stiffness (strength) of the yoke 14 may be deteriorated, and the natural frequency of the member may be decreased, thereby causing vibration. Therefore, demand for weight reduction of the fan cannot be sufficiently satisfied.

Under these circumstances, an object of the present invention is to provide a centrifugal fan which is light in weight and which has a structure for restraining vibration.

A centrifugal fan of the present invention includes a resin upper casing, a resin lower casing, an impeller, a motor, and a circuit board, and in the structure of the centrifugal fan, the impeller, the motor, and the circuit board are housed between the resin upper casing and the resin lower casing, ribs are formed at a bottom surface of the lower casing, the lower casing includes primary pins for fixing the circuit board to the lower casing, and the primary pins are reinforced by the rib.

In the present invention, an embodiment can be mentioned in which the ribs include primary ribs extending along a radial direction and secondary ribs extending along a circumferential direction, and each of the primary pins is provided in a standing manner at a part where the primary rib and the secondary rib intersect. Furthermore, in the present invention, an embodiment can be mentioned in which the lower casing includes a circular protruding part reinforced by the primary ribs, and a hollow cylindrical bearing holder rotatably holding a shaft, which is a rotating axis of the impeller, is held in the circular protruding part.

In the present invention, an embodiment can be mentioned in which a connecting part of the primary rib to the circular protruding part is approximately triangular in shape. Furthermore, in the present invention, an embodiment can be mentioned in which the approximately triangular shape of the primary rib is at a position overlapping the circuit board viewed from a direction vertical to the axis. Furthermore, in the present invention, an embodiment can be mentioned in which a stator core is fixed to the bearing holder, a resin insulator is attached to the stator core, and the insulator includes secondary pins which penetrate the circuit board arranged between the lower casing and the stator core and the lower casing.

In the present invention, an embodiment can be mentioned in which the secondary pins penetrate the circuit board at a position closer to an axis center than the primary pins, and the primary pins penetrate the circuit board at a position closer to an outer edge than the secondary pins. Furthermore, in the present invention, an embodiment can be mentioned, in which a stator core is fixed to the bearing holder, a resin insulator is attached to the stator core, the insulator includes concave parts at the top thereof and extending parts extending to a direction of the lower casing, and top of the extending part contacts a part that sandwiches a part in which the primary pin in the circuit board penetrates.

In the present invention, an embodiment can be mentioned in which the insulator includes a cylindrical part extending to a direction of the lower casing, and slits into which the primary rib is inserted are formed at the cylindrical part. Furthermore, in the present invention, an embodiment can be mentioned in which coil terminal insert holes, into which a terminal of a winding wire of the coil of the motor is inserted, are arranged in the circuit board, a penetrating hole is formed at a part of the coil terminal insert hole of the lower casing, and the terminal of the coil is connected to the circuit board inside the penetrating hole by soldering.

In the present invention, an embodiment can be mentioned, in which the lower casing includes a connector housing which is a part of the lower casing. Furthermore, in the present invention, the upper casing includes supporting pillars extending to a direction of the lower casing, and a top of the supporting pillar is melt and adhered to the lower casing in a manner penetrating the penetrating hole arranged through the lower casing.

According to the present invention, a centrifugal fan can be obtained, which is light in weight and has structure for restraining vibration.

BEST MODE FOR CARRYING OUT THE INVENTION

1. First Embodiment (Structure)

Figure 1:
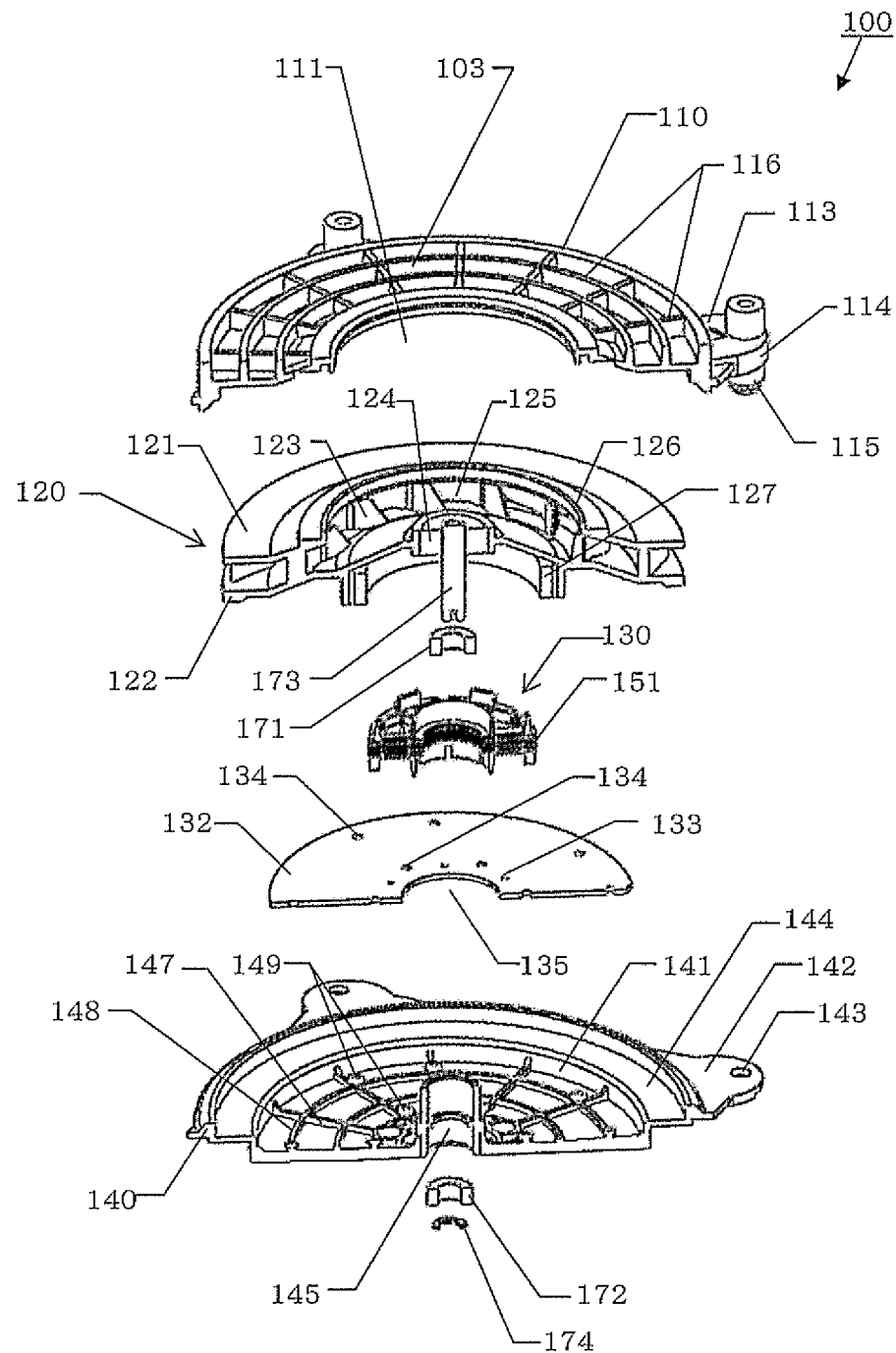
FIG. 1 is an exploded perspective view of an Embodiment.

FIG. 1 shows a centrifugal fan 100 of the Embodiment. A casing of the centrifugal fan 100 is made up of an upper casing 110 and a lower casing 140. An impeller 120, which is driven by a motor 130 and rotates, is housed between the upper casing 110 and the lower casing 140. Air is drawn into an intake inlet 111 by rotation of the impeller 120, passes between blades 123 of the impeller 120, and is exhausted outwardly of the casing through supply outlet 181 (see FIGS. 2 to 4) which is formed at a side surface except for supporting pillars 114 attached between the upper casing 110 and the lower casing 140.

The upper casing 110 is a molded formed product of resin (PBT resin, including one reinforced by glass fiber), and the intake inlet 111 for air is formed at the center thereof. Multiple ribs 116 are formed concentrically and radially at an upper surface side of the upper casing 110. A concave part (a part where material is removed) 103 is formed between the ribs 116, thereby maintaining strength and reducing weight. At four positions at a side surface of the upper casing 110, the supporting pillars 114 each of which is reinforced by a flange part 113, are integrally formed with the upper casing 110. At a lower top (lower casing 140 side) of the supporting pillars 114, a protruding part 115, which is used for binding with the lower casing 140, is formed.

The impeller 120 is made up of a circular shroud 121, a circular main plate 122, and multiple blades 123 arranged between the shroud 121 and the circular main plate 122. All of the blades 123 are of the same shape, slant backward, and are arranged at even spacing along a circumferential direction. In the present Embodiment, the circular shroud 121 and the blades 123 are integrally formed by resin forming, a hollow bush made of brass 124 (see FIG. 1) is integrally formed with the main plate 122 by an insert molding, and the main plate 122 is bonded to a lower surface of the blades 123 by ultrasonic adhesion.

As shown in FIG. 1, a metallic shaft 173 is fixed in the center of the bush 124 (the rotation center of the impeller 120). The shaft 173 is rotatably held in a bearing holder 145, which will be explained below, by ball bearings 171 and 172 (see FIGS. 3 and 4).

It should be noted that as another structure of the impeller 120, a structure may be mentioned in which the circular shroud 121 and the blades 123 are integrally molded and the main plate 122 is integrally formed by two color resin formation (at this time, the bush 124 is formed by insert molding). Furthermore, as another structure of the impeller 120, a structure may be mentioned in which the main plate 122 and the blades 123 are integrally molded (at this time, the bush 124 is formed by insert molding), and the shroud 121 is bonded to an upper surface of the blades 123 by ultrasonic adhesion.

Inside of the impeller 120, a circular rotor magnet 127 that is magnetized alternately with different polarity along a circumferential direction is fixed. The rotor magnet 127 is arranged so that it faces an outer circumferential surface of salient poles (polar teeth) 151a of a stator core 151 mentioned below (see FIGS. 5, 6, and 7) with a gap therebetween.

Figure 3:
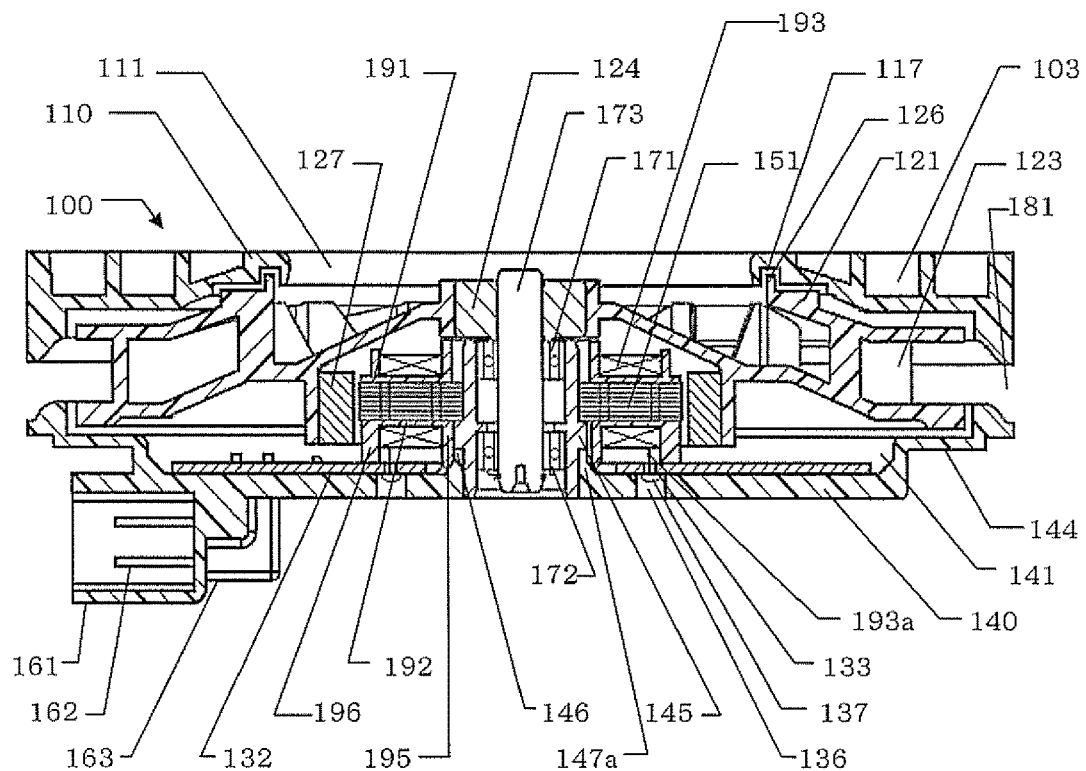
FIG. 3 is a cross-sectional view of the centrifugal fan of the Embodiment (cross-sectional view of location of back clearance part of bonding of coil terminal).

An inner circumferential edge of the shroud 121 forms intake inlets 125, and a circular protruding part 126 arranged in a standing manner to the axial direction is formed at the inner circumferential edge thereof. As shown in FIG. 3, the circular protruding part 126 formed at an upper part of the impeller 120 is contained in a circular concave part 117 formed at a lower surface of the upper casing 110 having a small gap therebetween so that a labyrinth seal is formed. This labyrinth seal prevents part of the air blown out of supply outlet 181 from flowing back to the intake inlet 111 through a gap formed between the lower surface of the upper casing 110 and the upper surface of the shroud 121.

The motor 130 is a brushless DC motor of an outer rotor type. A circuit board 132 is arranged between the motor 130 and the lower casing 140. Circuit wirings are formed on both surfaces and the electrical parts are attached on one surface on the circuit board 132. On the circuit board 132, an electrical circuit, a sensor circuit and the like, which are necessary to drive the motor 130 are installed.

On the circuit board 132, coil terminal insert holes 133 are arranged, each of which is a through hole into which a terminal 193a of coil 193 (see FIG. 3) wound around the stator core 151 of the motor 130 is connected. Furthermore, lower pin insert holes 134, into each of which resin pin 149 of the lower casing 140 penetrates, are formed through the circuit board 132. In addition, through holes into each of which a connector pin 162 (see FIG. 3) is connected are also formed on the circuit board 132.

The circuit board 132 is fixed to a concave part 141 of the lower casing 140 by the resin pins 149 (See FIG. 4) arranged in a standing manner on the lower casing 140. It should be noted that a structure is possible in which the motor 130 and the circuit board 132 are unified and this unified structure is fixed to the concave part 141 of the lower casing 140.

The lower casing 140 is formed by molding of synthetic resin (PBT resin, including glass-fiber reinforced PBT), and at the center thereof, the circular concave part 141 and step part 144 being an outer circumference of the concave part are formed. In the center of the concave part 141, the metallic bearing holder 145 is integrally molded (insert molding) with the lower casing in a standing manner. That is, the lower casing 140 is formed in a condition in which the bearing holder 145 is insert-molded. As explained below, the stator core 151 of the motor 130 is fixed to the bearing holder 145.

The pair of ball bearings 171 and 172 are engaged and adhered inside the bearing holder 145 in order to maintain a condition in which the shaft 173 is rotatably held. It should be noted that reference numeral 174 in FIG. 1 is an E ring fixing the ball bearing 172. A lower end of the bearing holder 145 forms an opening 150 (see FIGS. 2 and 4) at lower surface of the lower casing 140.

In the lower casing 140, the bearing holder 145 is formed axially in a standing manner at center of the concave part 141, and at lower side and an outer circumferential surface part of the bearing holder 145, a circular (cylindrical) protruding part 146, which is integrally molded with the lower casing 140, is formed. The bearing holder 145 is unified and held by the lower casing 140 and in a condition reinforced by the circular protruding part 146 from circumference.

At a bottom surface of the concave part 141 of the lower casing 140, multiple radial ribs 147 (twelve ribs in this example) which extend from outer circumferential surface of the circular protruding part 146 to the outermost circumference of the concave part 141 are formed, and furthermore, multiple concentric ribs 148 (four ribs in this example) connecting between the radial ribs 147 are formed. The resin lower casing 140 is reinforced by the ribs 147 and 148, and the stiffness of the lower casing 140 is maintained. It should be noted that since a gap between radial ribs 147 becomes wider toward outer circumference, the number of the ribs 147 can be increased at the outer circumferential side.

Furthermore, center side (side of the circular protruding part 146) of the radial ribs 147 is connected to approximately triangle ribs 147a (see FIGS. 3 and 6) which are formed at an outer circumferential surface of the circular protruding part 146. By the triangle ribs 147a, stiffness of the unified structure of the lower casing 140 and the circular protruding part 146 is maintained, and furthermore, stiffness of a fixing structure (unified structure) of the bearing holder 145 to the lower casing 140 supported by the circular protruding part 146 is maintained.

Furthermore, in the step part 144 of the lower casing 140, an outer circumferential side of the main plate 122 of the impeller 120 is contained in a condition not in contact. As a variation of shape of the triangle rib 147a, a shape can be employed which protrudes to the axial direction and supports and reinforces the circular protruding part 146 from outside. Practically, in addition to the triangle shape, a square shape, a shape in which circle or ellipse is divided into four sections, or a combination thereof, can be employed.

Figure 4:
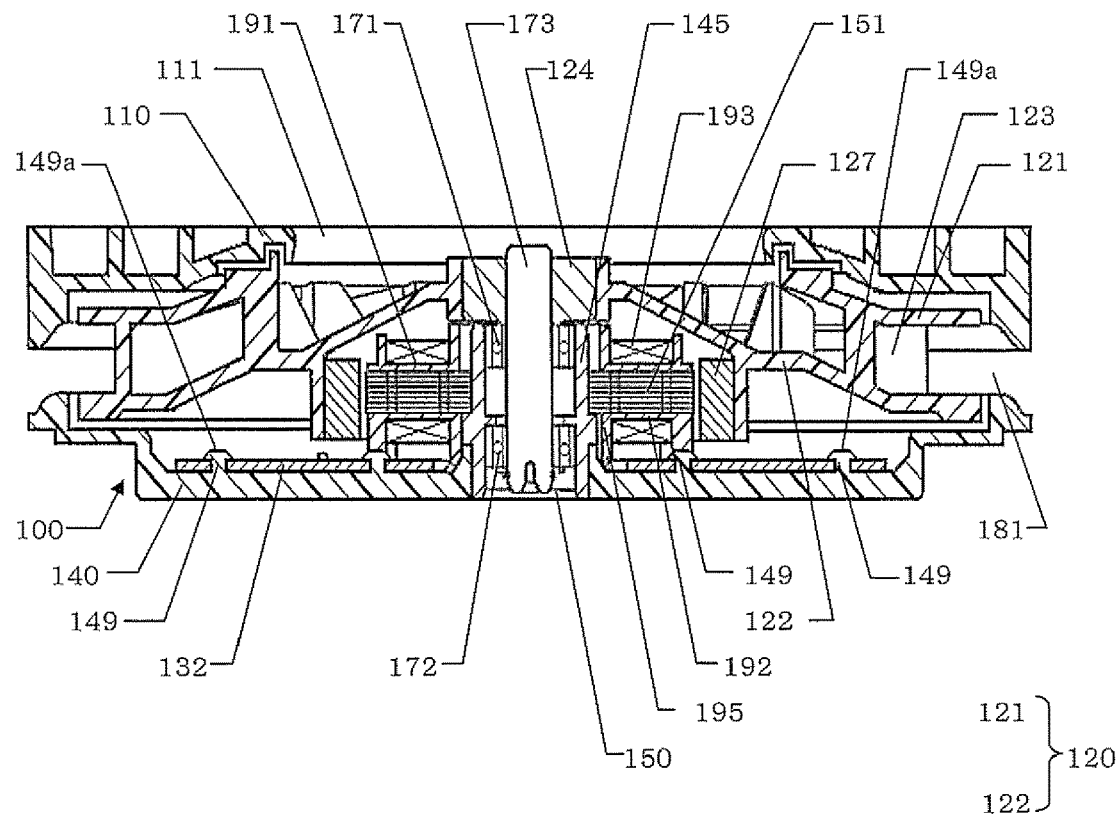
FIG. 4 is a cross-sectional view of the centrifugal fan of the Embodiment (cross-sectional view of location of resin pin).

At the bottom surface of the concave part 141 of the lower casing 140, multiple resin pins 149 are arranged in a standing manner and integrally molded with the lower casing 140 (see FIGS. 1 and 4). Each of the resin pin 149 extends to the axial direction, and is used to fix the circuit board 132 to the lower casing 140. The resin pins 149 are arranged at locations where the radial ribs 147 and the outermost and the innermost concentric ribs 138 intersect. By these resin pins 149 arranged at inner and outer concentric locations, the circuit board 132 is fixed to the lower casing 140 at the inner circumferential side and the outer circumferential side. It is desirable that there be a large number of resin pins 149, and it is more desirable the number be not less than four in one circumference, which are arranged considering balance.

Figure 2:
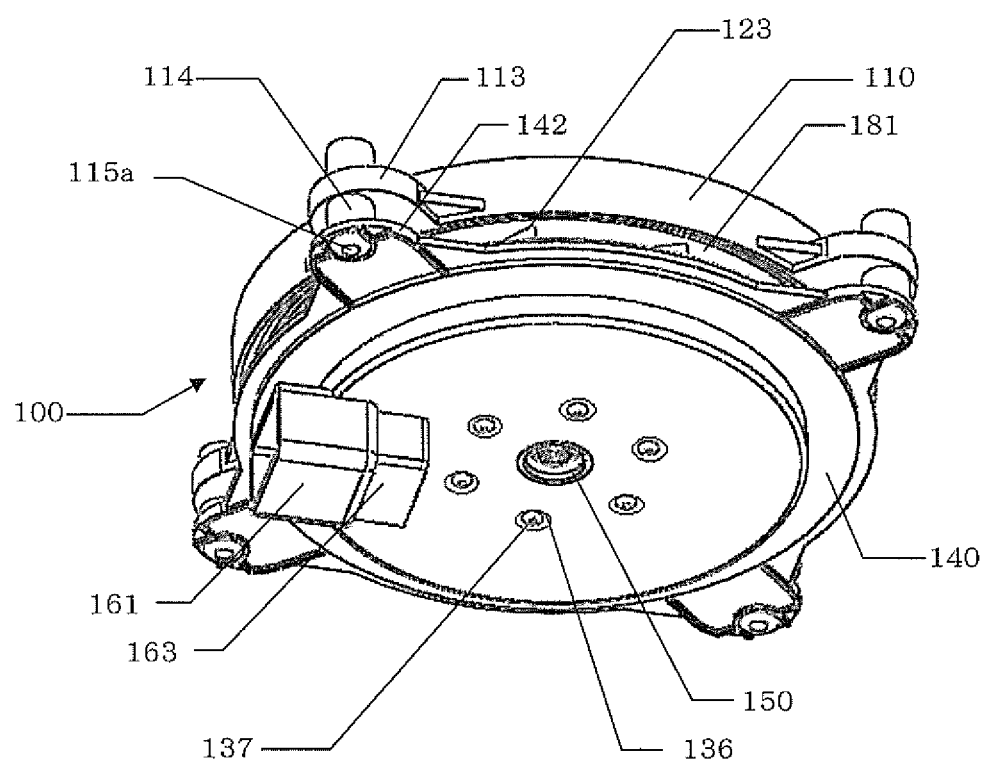
FIG. 2 is an perspective view of the Embodiment seen from bottom side.

At locations of the lower casing 140 corresponding to the coil terminal insert holes 133 of the circuit board 132, penetrating holes 136 (see FIGS. 2 and 3) for solder connecting of the terminal 193a (see FIG. 3) of the coil 193 onto the circuit board 132 are formed. By the existence of this penetrating hole 136, the terminal 193a of the coil 193 can be inserted into the coil terminal insert hole 133 (see FIGS. 1 and 3) from above (exposed surface side) and the solder connecting operation of the terminal 193a onto the circuit board 132 can be performed from a back surface side (side of viewpoint in FIG. 2) of the lower casing 140, in a condition in which the circuit board 132 is attached on the bottom surface of the concave part 141 of the lower casing 140. Reference numeral 137 in FIGS. 2 and 3 is the soldering connecting part of the terminal 193a onto the circuit board 132.

As shown in FIG. 3, during formation of the lower casing 140, a connector housing 161 is also formed by integral molding of resin at the same time. Inside of the connector housing 161, connector pins 162 are attached by pressing and inserting into the connector housing 161. At a back side of the connector housing 161, a protecting cover 163 is attached so as to prevent the connector pins 162 from being exposed.

As shown in FIGS. 3 and 4, the stator core 151 is fixed and arranged on an outer circumference of the bearing holder 145. The stator core 151 has a structure in which multiple steel plates of predetermined shape are layered, an opening is formed at the center thereof, and the bearing holder 145 is engaged therein. A resin upper insulator 191 and a resin lower insulator 192 are attached to the stator core 151 from both sides of the axial direction. The stator core 151 includes the multiple salient poles 151a (see FIGS. 5 and 6) that extend to outer direction of diameter along a circumferential direction, and the coil (stator coil) 193 is wound around these multiple salient poles 151a via the upper insulator 191 and the lower insulator 192. It should be noted that a condition in which the coil 193 is not wound is shown in FIGS. 5 and 6.

Figure 5:
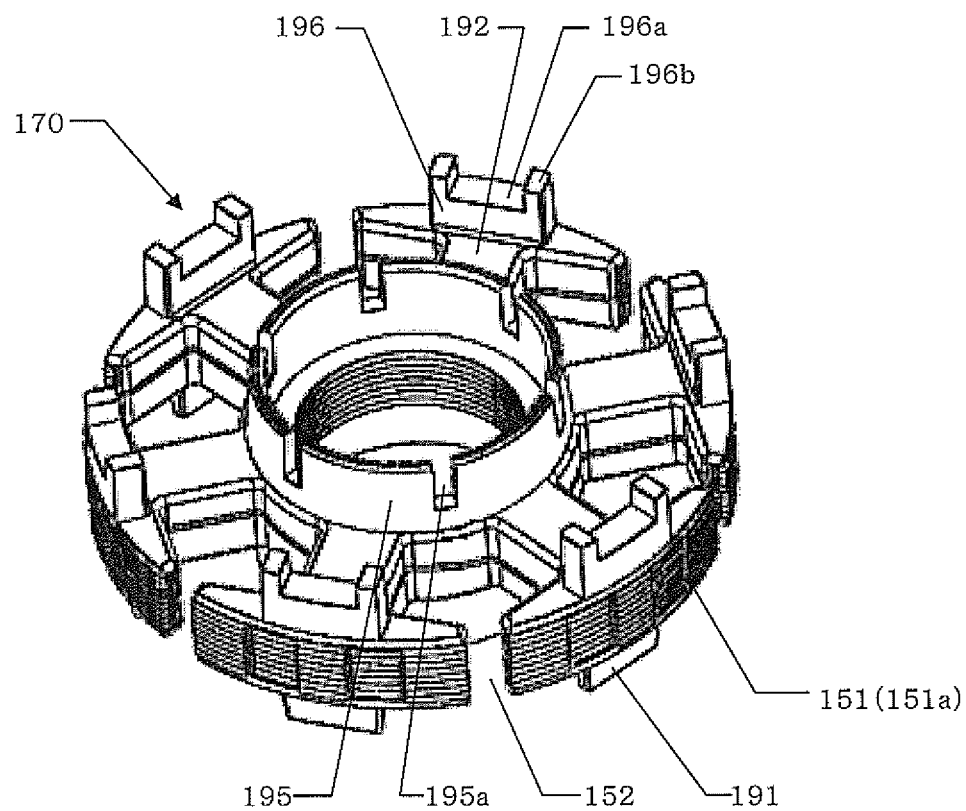
FIG. 5 is a perspective view showing a condition in which an insulator is attached to a stator core in the Embodiment seen from the lower insulator side.
Figure 6:
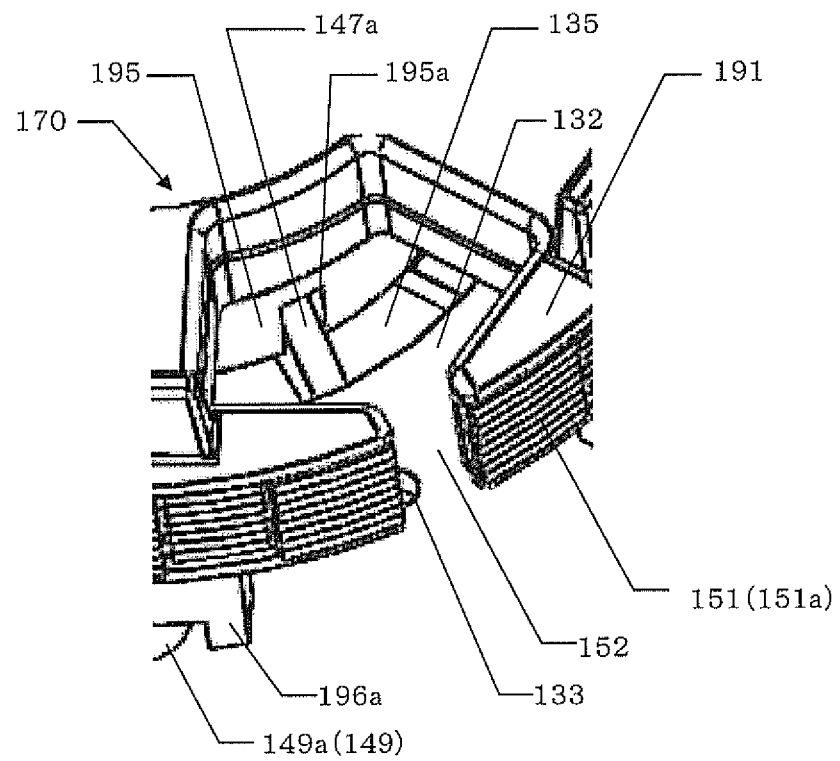
FIG. 6 is a partially magnified view showing a condition in which a stator structure is attached to a lower casing in the Embodiment.

As shown in FIG. 5, the lower insulator 192 includes a cylindrical part 195 extending along the axial direction at the center thereof. Multiple slits (cut off part) 195a are formed along a circumferential direction (at six parts in this example). The slit 195a is formed on a line connecting a center of slot 152, which is formed between adjacent salient poles 151a, and the axial center. The triangle rib 147a (see FIG. 6) formed on an outer circumferential surface of the protruding part 146 of the lower casing 140 is inserted in each of the slits 195a. The triangle ribs 147a are a central part of the radial ribs 147, and part extending from the triangle rib 147a to radially outer direction is the radial rib 174. Insertion of the ribs 147a into the slits 195a also functions as positioning of the stator core 151.

Since the triangle rib 147a positions at the center of the slot 152, if viewed from a direction vertical to the axis, interferes (contacts) with the coil 193 (see FIGS. 3 and 4; not shown in FIGS. 5 and 6.) can be avoided and the size of the rib 147a can be increased. As a result, stiffness of the lower casing 140 and stiffness of an integral structure of the lower casing 140 and the bearing holder 145 can be increased.

Extending parts 196 (see FIG. 5) extending to the axial direction are arranged on the lower insulator 192. The top of the extending part 196 is a double-branched structure, including a concave part 196a and protruding parts 196b sandwiching the concave part.

Hereinafter, one example of an operation to fix the circuit board 132 and the motor 130 to the lower casing 140 is explained, mainly with reference to FIG. 1. First, the upper insulator 191 and the lower insulator 192 are attached on the stator core 151; furthermore, the coil 193 is wound around the salient pole 151a so as to obtain a stator assembly 170 of FIG. 5.

On the other hand, the circuit board 132, on which electrical parts (not shown) are installed, is prepared. The circuit board 132 is attached on the bottom surface of the concave part 141 of the lower casing 140. During this process, the resin pins 149 arranged on the lower casing 140 in a standing manner are inserted into the lower pin insert holes 134, and the top thereof protrude from an upper surface of the circuit board 132. Next, the top part of the resin pins 149 protruding from the upper surface of the circuit board 132 are deformed, melt and adhered to the circuit board 132 by a method such as IR swaging or heat swaging. By this operation, pin melt adhered parts 149a are formed, and the circuit board 132 is fixed to the lower casing 140 by the resin pins 149. Furthermore, the connector pins 162 shown in FIG. 3 are bonded with the wiring pattern of the circuit board 132 by soldering.

Next, the stator assembly 170 being in a condition shown in FIG. 5 is engaged and adhered on the lower casing 140. In this operation, first, the terminal 193a (see FIG. 3) of the coil 193 is inserted into the coil terminal insert hole 133, and the top thereof is protruded inside of the penetrating hole 136. Next, the stator core 151 is engaged and adhered so as to fix in the bearing holder 145 that is integrally molded with the lower casing. It should be noted that an adhesive can also be used in this fixation.

Figure 7:
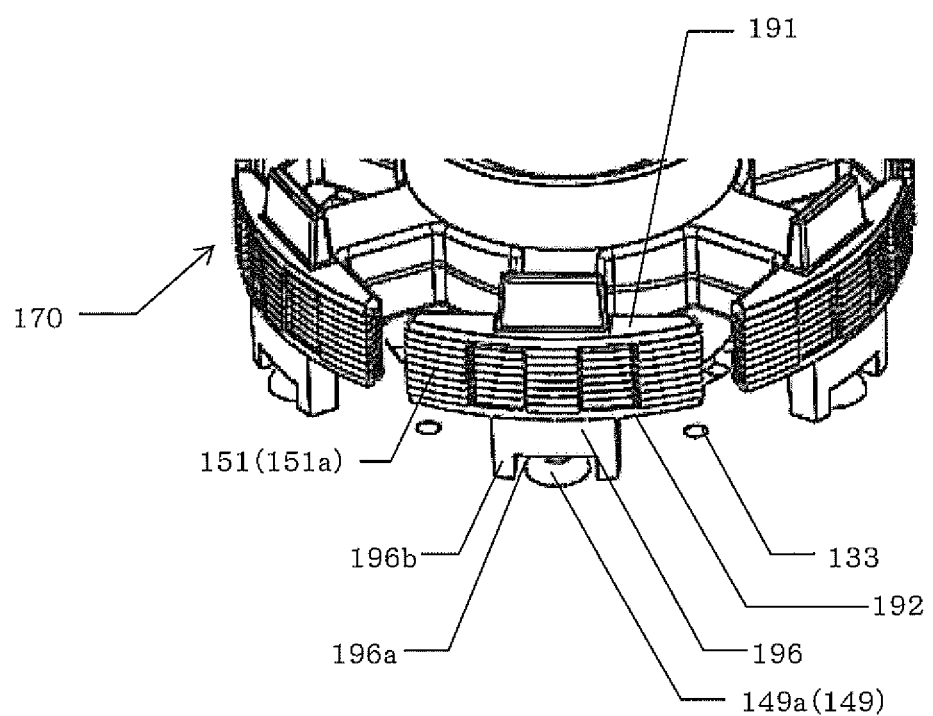
FIG. 7 is a partially magnified view showing a condition in which a stator core is attached to a lower casing in the Embodiment.

In the attachment of the abovementioned stator assembly 170 to the lower casing 140, each of the pin melt adhered parts 149a is positioned between the protruding parts 196b that are at both sides of a top of the extending part 196, and the pin melt adhered part 149a is contained inside of the concave parts 196a. Furthermore, the pair of the protruding parts 196b makes contact with the circuit board 132 at a position of which the pair of the protruding parts sandwich the pin melt adhered part 149a. This condition is shown in FIGS. 6 and 7. In this condition, the concave part 196a functions as a back clearance part for the pin melt adhered part 149a, and tops of the pair of the protruding parts 196b contact the circuit board 132. Here, the contact part of the top of the protruding part 196b and the circuit board 132 can be affixed by an adhesive.

Next, inside of the penetrating hole 136, top of the coil terminal 193a inserted into the coil terminal insert hole 133 is connected by soldering to the wiring pattern of the circuit board 132. Thus, the soldering connecting parts 137 in FIGS. 2 and 3 are formed.

As shown in FIGS. 1 and 2, the upper casing 110 and the lower casing 140 are bound via the supporting pillars 114 arranged therebetween. In practice, the supporting pillar 114 is formed at the flange part 113 arranged on an outer circumferential part of the upper casing 110, is integrally formed with the upper casing 110 by molding of resin (PBT resin, including one reinforced by glass fiber), and has the protruding part 115 formed at the top part thereof. This protruding part 115 is inserted into a penetrating hole 143 formed at a flange 143 of the lower casing 140, and the top part 115a (see FIG. 2) of the protruding part 115 protruded from the penetrating hole 143 is melt and adhered (for example, ultrasonic melt adhesion, vibration melt adhesion, laser melt adhesion or the like) or heat swaged so that the supporting pillars 114 and the lower casing 140 are bonded.
(Superior Effects)

The weight of the lower casing 140 can be reduced by making it from resin, and deterioration of stiffness due to thinness can be avoided by providing the multiple ribs (the radial ribs 147 and the concentric ribs 148) formed on a bottom surface of the concave part 141. Furthermore, stiffness of the bearing structure of the shaft 173 can be maintained by the triangle ribs 147a formed on an outer circumferential surface of the circular protruding part 146.

Furthermore, the circuit board 132 is fixed to the lower casing by the resin pins 149 protruding from the lower casing 140. In this structure, the lower casing 140 and the circuit board 132 are unified, and thereby, the lower casing 140 is reinforced by the circuit board 132. Therefore, structure of the lower casing 140 is of light weight and has high stiffness, thereby preventing vibration.

In particular, since bonding of the circuit board 132 to the lower casing 140 using the resin pins 149 is accomplished at two concentric circular parts in the circuit board 132, the circuit board 132 is strongly bonded to the lower casing 140.

In particular, each of the resin pins 149 is formed at an intersecting point of a radial rib 147 and a concentric rib 148 which reinforce the lower casing 140. Since the intersecting point part of the ribs has high strength, by arranging the resin pins 149 at the intersecting point parts in a standing manner and by pressing the circuit board 132 around intersecting points of the ribs by the resin pins 149 so as to fix them, bonding strength of the lower casing 140 and the circuit board 132 can be high and stiffness of a structure in which both are unified can be high. Therefore, a structure can be obtained in which weight is reduced and little vibration occurs.

Furthermore, automation of a bonding operation of the lower casing 140 and the supporting pillars 114 is easy, thereby enabling reduction in production cost. Furthermore, by making the lower casing 140 using resin, there is no need to arrange an insulator sheet between the circuit board 132 on which electrical parts are installed and the lower casing 140, and the number of parts can be reduced. Furthermore, the outermost circumference of the lower casing 140 forms the supply outlet 181, and in this case, since the lower casing 140 is made of resin, there is a great freedom of design of the shape of a part that forms the supply outlet 181, and it would be easy to control the airflow direction of air from the supply outlet 181. As a result, noise due to blowing out of air can be reduced.

At the center of the circuit board 132, a circular opening hole 135 (see FIGS. 1 and 6) is formed. This opening hole 135 functions as a space for back clearance of the triangle ribs 147a formed on an outer circumferential surface of the protruding parts 146 (see FIGS. 3 and 4), and prevents the ribs 147a from contacting the circuit board 132.

(Conclusion)

The centrifugal fan 100 (FIG. 1) has a structure in which the impeller 120, the motor 130 and the circuit board 132 are housed between the resin upper casing 110 and the resin lower casing 140, the radial ribs 147 and the concentric ribs 148 for reinforcing are formed on the bottom surface of the concave part 141 of the lower casing 140, the resin pins 149 are arranged on these rib parts in a standing manner, and the circuit board 132 is fixed to the lower casing 140 by the resin pins 149.

According to this structure in which resin is used and reinforcing is provided by the radial ribs 147 and the concentric ribs 148, weight of the lower casing 140 can be reduced. In particular, the circuit board 132 and the lower casing 140 are unified by the resin pins 149 of which stiffness is maintained by the ribs. As a result, stiffness of the lower casing 140 can be great without thickening the resin lower casing 140, and a centrifugal fan 100 having low vibration can be obtained.

Furthermore, the resin pins 149 are arranged in a standing manner at the intersecting parts of the radial ribs 147 and the concentric ribs 148. Since the intersecting part of the radial rib 147 and the concentric rib 148 has high stiffness, by arranging the resin pin 149 there in a standing manner, stiffness of the resin pin 149 itself can be greater. Therefore, stiffness of a unified structure of the lower casing 140 and the circuit board 132 by the resin pins 149 can be greater, and a structure that is difficult to vibrate can be obtained.

The lower casing 140 includes the circular protruding part 146 which is reinforced by the radial ribs 147, and the bearing holder 145 having hollow cylindrical shape which rotatably maintains the shaft 173 being rotational axis of the impeller 120 held in the circular protruding part 146 by integral molding. According to this structure, since it is difficult to vibrate the bearing holder 145, a centrifugal fan 100 can be obtained in which vibration due to rotation of the impeller 120 is reduced.

The stator core 151 (FIGS. 3 and 4) is fixed to the bearing holder 145, the resin lower insulator 192 is attached on the stator core 151, the lower insulator 192 includes the cylindrical part 195 (FIGS. 3, 4, 5 and 6) extending to a direction of the lower casing 140, and through the cylindrical part 195, the slits 195a (FIG. 5) are formed into which the triangle ribs 147a connected to the circular protruding part 146 of the radial ribs 147 (FIG. 1) are inserted.

According to this structure, the triangle ribs 147 and the slits 195a can be used for positioning mechanism of the stator assembly 170 (FIG. 5) to the lower casing 140, and the structure can be obtained in which assembling is easy to performed. Furthermore, since the size of the triangle ribs 147a can be larger, reinforcing of the circular protruding part 146 can be performed more reliably by the triangle ribs 147a.

The lower insulator 192 includes the concave part 196a (FIG. 5) formed at the top thereof and the extending part 196 extending to a direction of the lower casing 140. At the top of the extending part 196, the pair of the protruding parts 196b protruding to axial direction at the both sides of the concave part 196a. As shown in FIG. 7, the pair of the protruding parts 196b contacts the circuit board 132 at a position circumferentially sandwiching a part through which resin pin 149 penetrates the circuit board 132.

Viewing from a viewpoint of FIG. 7, the concentric rib 148 exists on back side surface of a part circumferentially sandwiching the melt adhered part 149a (FIGS. 4, 6 and 7) of the resin pin 149 to the circuit board 132. According to this structure in which the protruding parts 196b of two-branched structure contact this part sandwiched in a circumferential direction, a condition is accomplished in which the pair of the protruding parts 196b and the concentric rib 148 sandwiches the circuit board 132, fitting property of the circuit board 132 to the lower casing 140 is improved.

Since the circuit board 132 is planar, it can vibrate, depending on the supporting structure. By the structure in which the circuit board 132 is sandwiched between the protruding parts 196b and the concentric rib 148, since the circuit board is pressed to the concentric rib 148 at multiple points, it is difficult for the circuit board 132 to vibrate.

On the circuit board 132, the coil terminal insert holes 133 (FIGS. 1 and 3) into which the terminal 193a (FIG. 3) of the coil 193 of the motor 130 (FIG. 1) is inserted are formed. At the part of lower casing 140 corresponding to the coil terminal insert holes 133, the penetrating holes 136 (FIG. 3) are formed. Inside the penetrating hole 136, the terminal 193a of the coil 193 is connected to the circuit board 132 by soldering, and the soldering connecting parts 137 (FIGS. 2 and 3) are formed.

In this structure, via the penetrating hole 136 from a back surface side of the lower casing 140, the terminal 193a penetrating the circuit board 132 is soldered to the circuit board 132. Winding wire of the coil 193 used in the centrifugal fan 100 is thin, and careful handling is necessary; however, the above structure is superior, so that workability of operation of soldering connecting part 137 is high and the operation can be performed reliably.

2. Second Embodiment (Structure)

Figure 8:
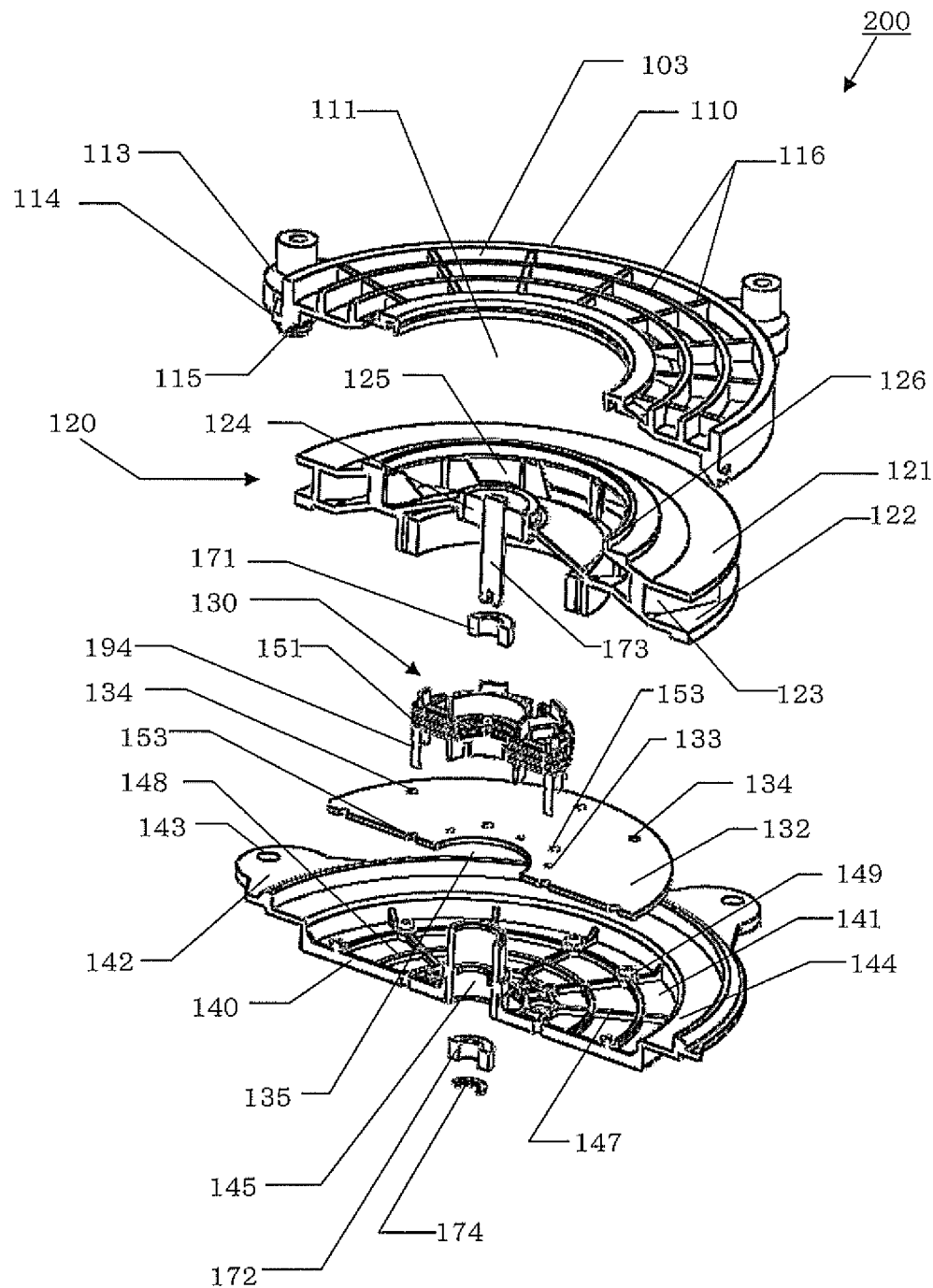
FIG. 8 is an exploded cross-sectional perspective view of another Embodiment.
Figure 9:
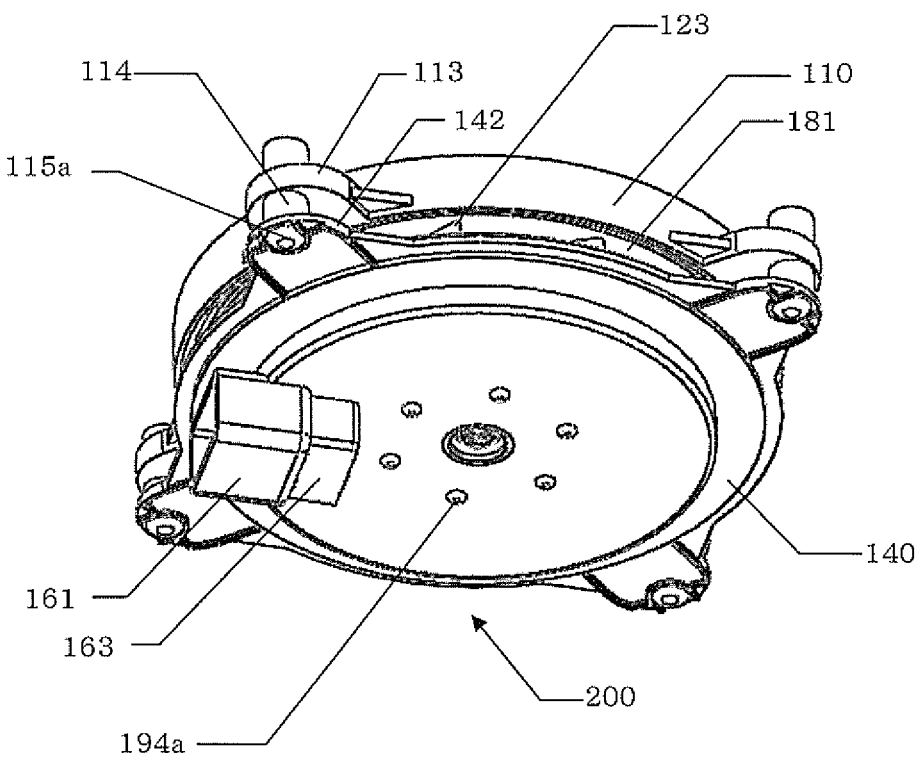
FIG. 9 is a perspective view of the Embodiment seen from a bottom side.
Figure 10:
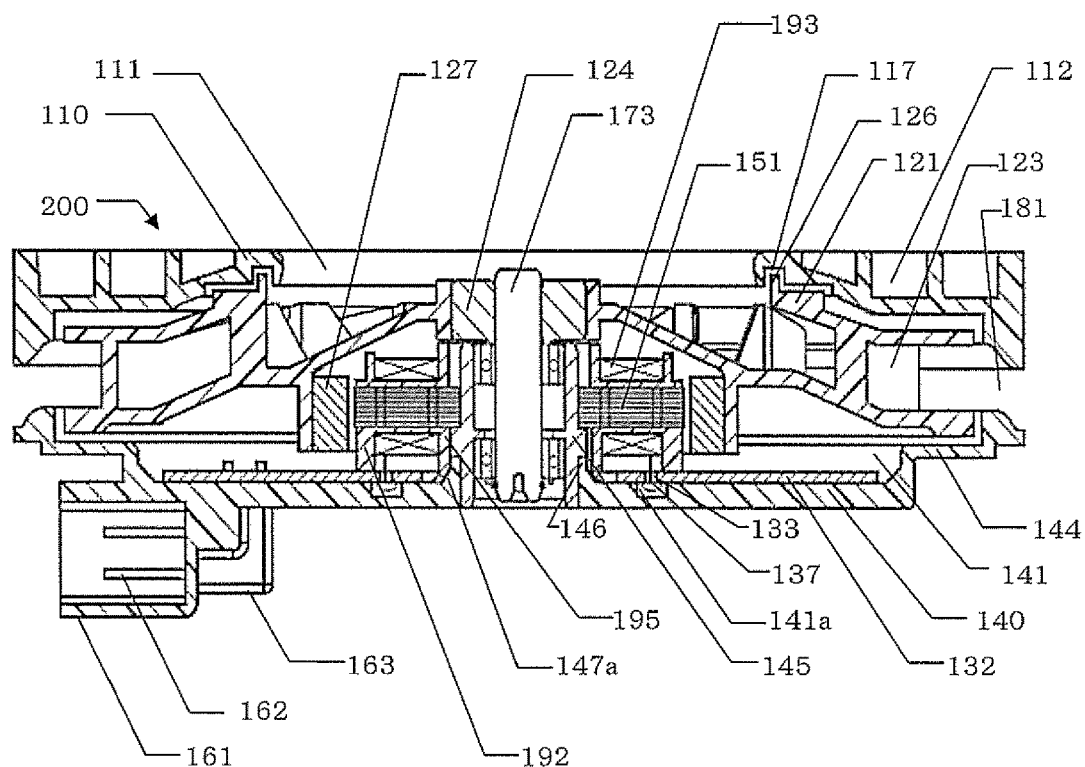
FIG. 10 is a cross-sectional view of the centrifugal fan of the Embodiment (cross-sectional view of location of back clearance part of bonding of coil terminal).
Figure 11:
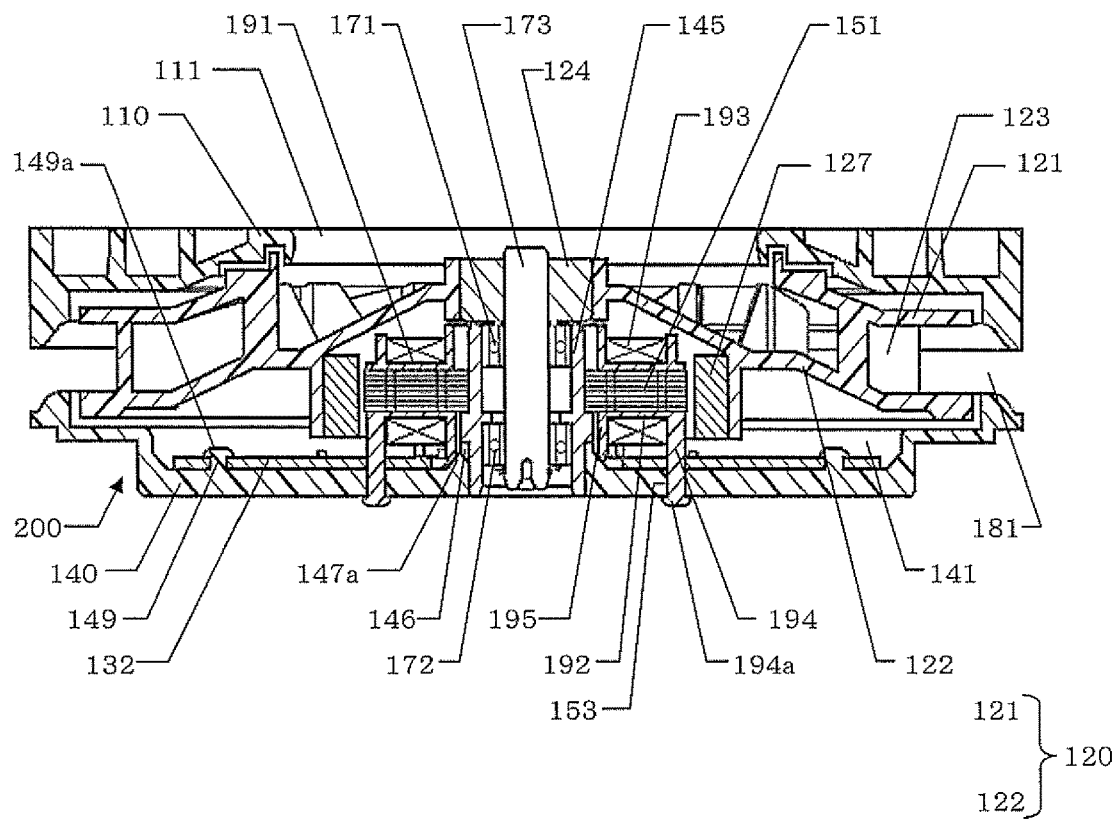
FIG. 11 is a cross-sectional view of the centrifugal fan of the Embodiment (cross-sectional view of location of resin pin).

FIG. 8 shows a centrifugal fan 200 of the Embodiment. FIG. 9 shows a perspective view of the centrifugal fan 200, and FIGS. 10 and 11 show a cross sectional view seen from a direction perpendicular to an axis of the centrifugal fan 200. In the following explanation, a part having the same reference numeral as in the First Embodiment is the same as that explained in the First Embodiment. Hereinafter, a part that is the same as in the First Embodiment is explained simply, and the part that is different from the First Embodiment is explained in detail.

The centrifugal fan 200 is formed by an upper casing 110 and a lower casing 140, and an impeller 120, which is driven by a motor 130 and rotates, is housed between the upper casing 110 and the lower casing 140. Air is drawn into an intake inlet 111 by rotation of the impeller 120, and is exhausted out of the casing through supply outlet 181 to an outer direction of the diameter.

The upper casing 110 includes the intake inlet 111, ribs 116, concave parts 103, flanges 113, supporting pillars 114, and protruding parts 115. The impeller 120 includes a circular shroud 121, a circular main plate 122, and blades 123. A bush 124 and a rotor magnet 127 are fixed inside the main plate 122. A metallic shaft 173 is fixed at the center of the bush 124. The shaft 173 is rotatably held by a bearing holder 145 mentioned below, via ball bearings 171 and 172.

The inner circumferential edge of the circular shroud 121 forms the intake inlet 125, and a circular protruding part 126 is arranged at the inner circumferential edge in a standing manner toward the axial direction. As is similar to the case of the First Embodiment, a labyrinth seal is formed using the circular protruding part 126.

The motor 130 is a brushless DC motor of an outer rotor type, is unified with the circuit board 132, and is attached on the bottom surface of a concave part 141 formed on the lower casing 140. The following holes are formed through the circuit board 132, that is, coil terminal insert holes 133 which are a through hole into which a terminal of a coil 193 is connected; penetrating holes 153 into which resin pins 194 of a lower insulator 192 penetrate; and penetrating holes 134 into which resin pins 149 of the lower casing 140 penetrate.

As is similar to the case of the First Embodiment, the lower casing 140 includes the circular concave part 141 at the center thereof and a step part 144 at an outer circumferential side thereof. The metallic bearing holder 145 is integrally molded in a standing manner at the center of the concave part 141. The pair of ball bearings 171 and 172 are engaged and adhered inside of the bearing holder 145 in order to rotatably hold the shaft 173.

A circular (cylindrical) protruding part 146, which is integrally molded with the lower casing 140, is formed on an outer circumferential surface of a lower side of the bearing holder 145. The bearing holder 145 is held by being unified with the lower casing 140 in a condition being reinforced from the circumference by the circular protruding part 146.

Multiple radial ribs 147, which extend from outer circumferential surface of the protruding part 146 to the outermost circumferential edge of the concave part 141, are formed on a bottom surface of the concave part 141. Furthermore, multiple concentric ribs 148 which connect between the radial ribs 147 are formed. Furthermore, a center side of the radial rib 147 (side of the protruding part 146) is connected to triangle rib 147a that reinforces the protruding part 146. It should be noted that the number of the concentric ribs 148 can be one.

Figure 12:
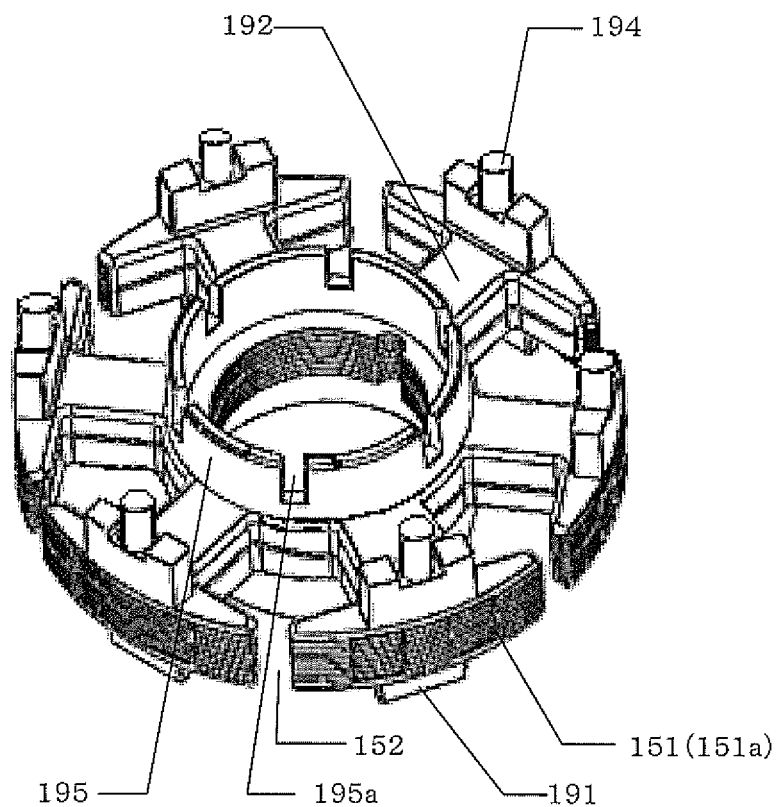
FIG. 12 is a perspective view showing a condition in which an insulator is attached to a stator core in the Embodiment seen from a lower insulator side.
Figure 13:
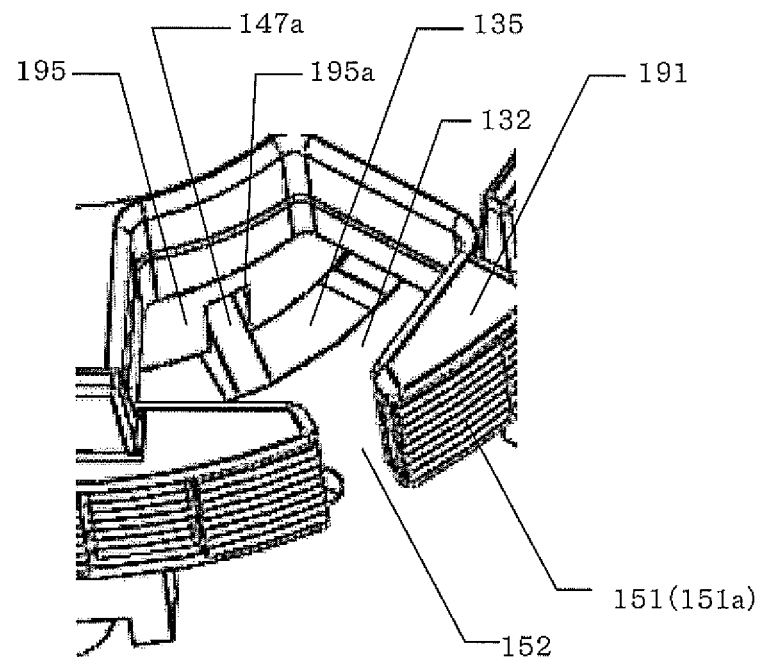
FIG. 13 is a partially magnified view showing a condition in which a stator structure is attached to a lower casing in the Embodiment.

FIGS. 12 and 13 show a condition in which an upper insulator 191 and the lower insulator 192 are attached on a stator core 151. The resin pins 194 which are formed by integral molding with the lower insulator 192 are formed on a lower surface of the lower insulator 192. Each of the resin pins 194 extends toward axial direction (direction of the lower casing 140), and is arranged at approximately a central part along a circumferential direction of a lower surface of a top of each salient pole 151a of the stator core 151. The lower insulator 192 includes a cylindrical part 195 through which slits 105a are formed. The structure of this part is as the same as that in the First Embodiment.

Hereinafter one example of the assembling process is explained. The lower insulator 192 and the circuit board 132 are bonded. First, the resin pins 194 formed on a lower surface of the lower insulator 192 are inserted into the penetrating holes 134 (see FIG. 8) formed on the circuit board 132. At the same time, the terminals of the coil 193 wound around the salient poles 151a are inserted into the coil terminal insert holes 133 formed on the circuit board 132.

After that, the wiring pattern formed on the circuit board 132 and the terminal of the coil 193 are electrically bonded by soldering from an opposite side of the lower insulator 192. By this bonding, a stator assembly in which the circuit board 132 is attached on a lower surface of the lower insulator 192 is obtained. The soldering connecting part 137 (bonded part) of this wiring pattern and the terminal of the coil 193 forms a protruding part (See FIG. 10). At a bottom surface of the concave part 141 of the lower casing 140, concave back clearance parts 141a are formed, into each of which the protruding soldering connecting part 137 is contained. Here, the circuit board 132 has both sides wiring and one side electrical parts installed.

Next, the stator assembly constructed by the stator core 151, the upper insulator 191, the lower insulator 192, the coil 193 and the circuit board 132 is attached on the lower casing 140. In this operation, first, the stator assembly (the stator core 151) is engaged and adhered to the bearing holder 145. At this time, positioning is performed in order that the ribs 147a are inserted into the slits 195a formed on the cylindrical part 195 shown in FIG. 12. Furthermore, the resin pins 194, which have already penetrated the penetrating holes 134, are further penetrated into the penetrating holes 153 formed through the lower casing 140, and the tops thereof are protruded from back surface of the lower casing 140 (See FIG. 11).

Furthermore, during the above operation, the resin pins 149 of the lower casing 140 are penetrated through the penetrating holes 134 formed through the circuit board 132. Here, the location at which each of the resin pins 149 of the lower casing 140 is formed is an intersecting point of a radial rib 147 and a concentric rib 148. Then, the top of the resin pins 194 protruding from a lower surface of the lower casing 140 are deformed by IR swaging, heat swaging or the like so as to form pin melt adhered parts 194a. Furthermore, in a similar manner, the top of the resin pins 149 protruding from the circuit board 132 are deformed so as to form pin melt adhered parts 149a.

As a result, the stator assembly formed by the stator core 151, the upper insulator 191, the lower insulator 192, the coil 193 and the circuit board 132 is fixed on the bottom surface of the concave part 141 of the lower casing 140. It should be noted that bonding of the upper casing 110 and the lower casing 140 and the connecting of wiring are performed in a manner similar to that in the First Embodiment.

(Superior Effects)

Since the stator assembly formed by the stator core 151, the upper insulator 191, the lower insulator 192, the coil 193 and the circuit board 132 and the lower casing 140 are unified by the resin pins 194 formed on the lower insulator 192, stiffness can be high, and the natural frequency of the lower casing 140 can be high. As a result, vibration of the lower casing 140 due to fast rotation of the impeller 120 can be prevented. Furthermore, since the resin pins 149 formed on the lower casing 140 penetrates the outer circumferential side of the circuit board 132, a part close to an outer edge of the circuit board 132 is fixed to the lower casing 140 by the resin pins 149. Therefore, the unified structure of the circuit board 132 and the lower casing 140 is stronger, and vibration can be further prevented.

(Conclusion)

As mentioned above, the centrifugal fan 200 has a structure in which the impeller 120 is housed between the upper casing 110 and the lower casing 140, the lower casing 140 includes the circular protruding part 146 reinforced by the multiple triangle ribs 147a, and the hollow cylindrical bearing holder 145, which rotatably holds the shaft 173, which is the rotational axis of the impeller 120, is held in the circular protruding part 146.

The bearing holder 145 is a member that rotatably holds the shaft 173 via the ball bearings 171 and 172, and wobbling of the bearing holder 145 to the axial direction (extending direction of the shaft 173) may cause vibration. Therefore, the bearing holder 145 must be fixed to the lower casing 140 with a strength that makes the wobbling difficult to occur. In the centrifugal fan 200, since the bearing holder 145 is held inside of the circular protruding part 146 reinforced by the triangle ribs 147a, stiffness of the unified structure of the lower casing 140 and the bearing holder 145 can be increased, and the abovementioned structure can be obtained in which wobbling to the axial direction is difficult to occur. Therefore, a centrifugal fan can be obtained in which the lower casing 140 is made of resin in order to reduce weight and in which vibration is difficult to occur by restraining the wobbling of the axis.

The stator core 151 is fixed to the bearing holder 145, the resin lower insulator 192 is attached on the stator core 151, and the lower insulator 192 includes the resin pins 194 which penetrate the circuit board 132 arranged between the lower casing 140 and the stator core 151 and the lower casing 140.

According to this structure, the stator core 151 is fixed to the lower casing 140 by the resin pins 194 and the circuit board 132 is also fixed to the lower casing 140 by the resin pins 194. Therefore, a structure can be obtained in which stiffness is high in the condition in which the lower casing 140 and the stator assembly are bonded and the circuit board 132 is difficult to vibrate.

Relatively viewing, the resin pins 194 (FIG. 11) penetrate an axial center side of the circuit board 132 and the resin pins 149 penetrate an outer edge side (side apart from an axial center). Furthermore, a top of the resin pins 149 protruding from an upper surface are deformed so as to form the pin melt adhered parts 149a around an outer edge of the circuit board 132, and a circumferential edge of the circuit board 132 is pressed to the lower casing 140 by the resin pins 149 so as to fix it. Unless the circuit board 132 is fixed around an outer edge thereof, vibration may easily occur at that part. According to the abovementioned structure, since around an outer edge thereof, the circuit board 132 is fixed to the lower casing 140, vibration in the circuit board 132 and vibration in the structure in which the circuit board 132 and the lower casing 140 are unified, can be effectively reduced.

The lower insulator 192 includes the cylindrical part 195 (FIGS. 3, 4, 5 and 6) extending to direction of lower casing 140, and the slits 195a into which the triangle ribs 147a are inserted are formed through the cylindrical part 195. According to this structure, positioning is easy during the assembling of the stator assembly and the lower casing 140, and the size of the triangle rib 147a, which is a reinforcing structure, can be maintained.

Viewed from a direction perpendicular to the axis, the triangle rib 147a is located overlapping the circuit board 132 (FIGS. 3 and 4). According this structure, a centrifugal fan can be obtained in which size along the axial direction is reduced.

The lower casing 140 includes a connector housing 161, which is integrally formed with the lower casing 140 and is a part of the lower casing 140. According to this structure, the number of parts can be reduced.

The upper casing 110 includes the supporting pillars 114 (FIG. 2) extending to a direction of the lower casing 140, and a top of the supporting pillar 114 is melted and adhered to the lower casing 140 in a condition penetrating the penetrating hole 143 (FIG. 1) formed through the lower casing 140. According to this structure, a process in which upper casing 110 and the lower casing 140 are bonded is easily performed, and bonding strength can be higher.

3. Third Embodiment

Figure 14:
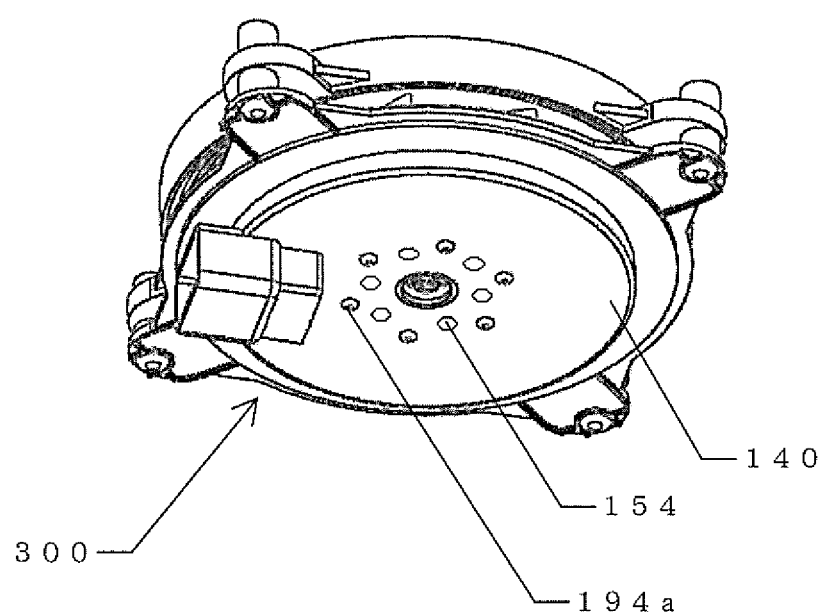
FIG. 14 is a perspective view of another Embodiment seen from a bottom side.
Figure 15A:
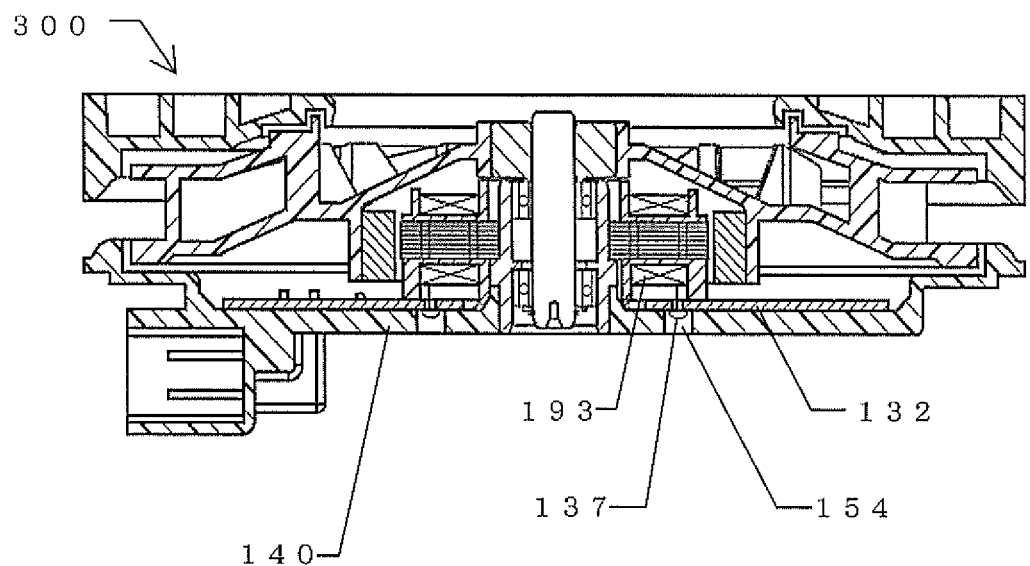
FIG. 15A is a cross-sectional view of the centrifugal fan of the Embodiment (cross-sectional view of location of back clearance part of bonding of coil terminal) and FIG. 15B is a cross-sectional view (cross-sectional view of location of resin pin).
Figure 15B:
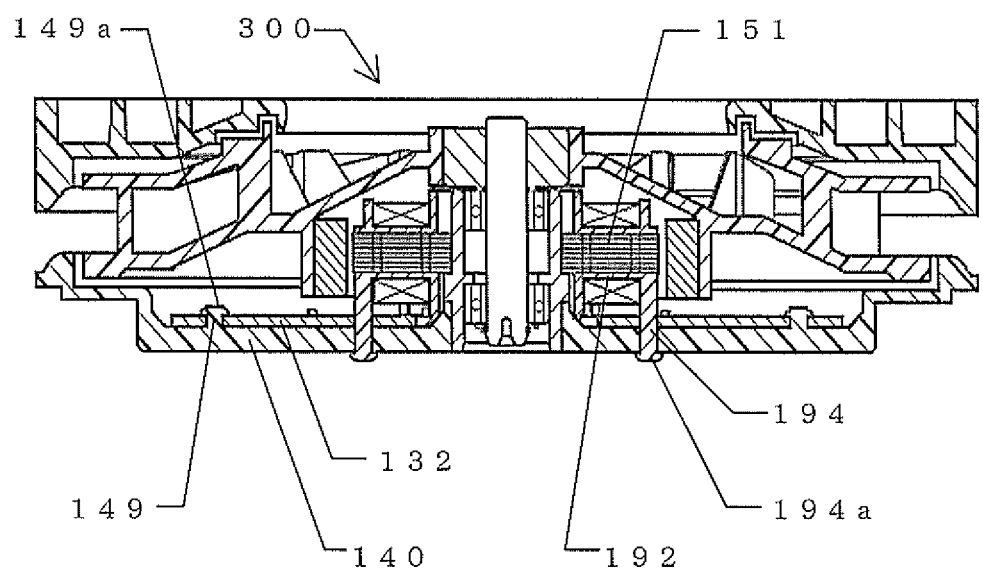
Figure 16:
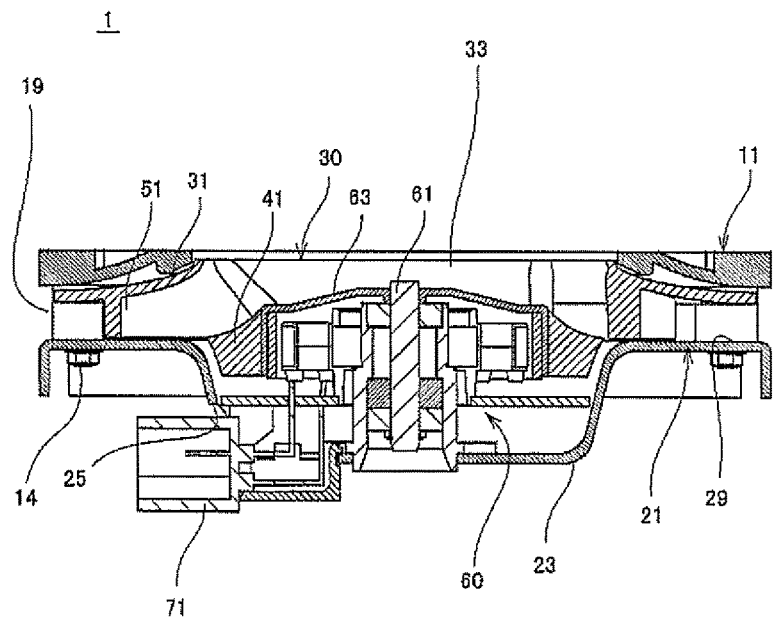
FIG. 16 is a cross-sectional view showing a conventional centrifugal fan (Patent Document 1).
Figure 17:
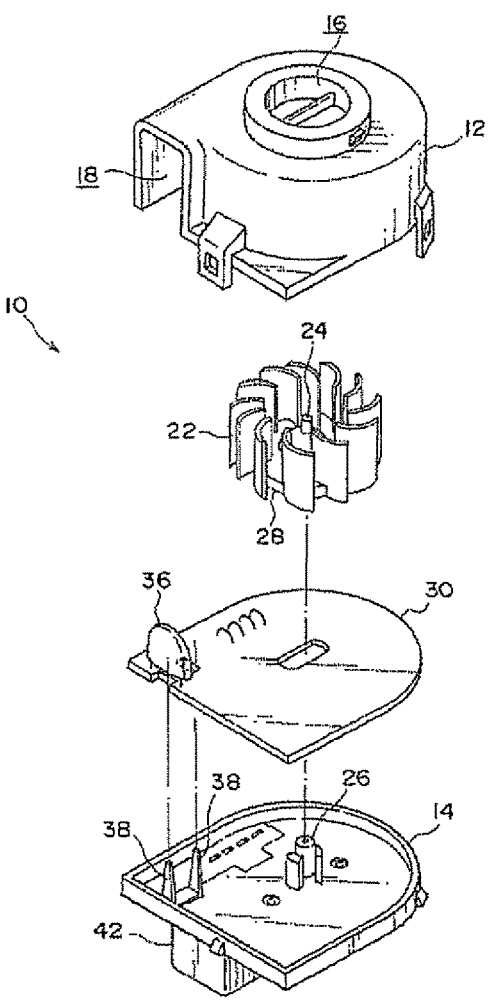
FIG. 17 is an exploded perspective view showing a conventional fan (Patent Document 2).

FIG. 14 shows a perspective view of a centrifugal fan 300 of this Embodiment, and FIGS. 15A and 15B show cross sectional views thereof. Hereinafter, parts different from the First and Second Embodiments are explained. In this Embodiment, a circuit board 132 is fixed to a lower casing 140 by resin pins 149. That is, holes into which the resin pin 149 penetrates are formed through the circuit board 132, and the resin pin 149 penetrates this hole. Then, tops of the resin pins 149 protruding from the circuit board 132 are plastically deformed (for example, by heat swaging), and pin melt adhered parts 149a are formed. By forming the pin melt adhered part 149a, fixation of the circuit board 132 to the lower casing 140 by the resin pins 149 is accomplished.

In addition, a lower insulator 192 includes resin pins 194 extending downwardly. The resin pins 194 penetrate the lower casing 140.

Tops of the resin pins 149 penetrating the lower casing 140 are plastically deformed, and pin melt adhered parts 194a are formed. By forming the pin melt adhered part 194a, fixation of the lower insulator 192 (a stator including a stator core 151) and the lower casing 140 is accomplished.

Furthermore, penetrating holes 154 are formed through the lower casing 140. Then, terminal of coil 193 is connected by soldering to the circuit board 132 inside the penetrating hole 154, so as to form soldering connecting part 137.

4. Other Embodiments

A structure in which the structures of FIGS. 5 and 12 are combined is also possible. For example, a structure is possible in which the structure having the concave part 196a and the protruding part 196b and the structure having the resin pins 194 are alternately arranged along circumferential directions in six radial poles in a lower insulator 192. In this case, situation in FIG. 4 shows a cross sectional structure in which a part having the concave part 196a is seen from a direction perpendicular to the axis. Furthermore, situation in FIG. 11 shows a cross sectional structure in which a part having the resin pins 194 is seen from a direction perpendicular to the axis.

EXPLANATION OF REFERENCE NUMERALS

100: centrifugal fan,
103: concave part,
110: upper casing,
111: intake inlet,
113: flange part,
114: supporting pillar, 115: protruding part,
116: rib,
117: circular concave part,
120: impeller,
121: shroud,
122: main plate,
123: blade,
124: bush,
125: intake inlet,
126: circular protruding part,
127: rotor magnet,
130: motor,
132: circuit board,
133: through hole,
134: penetrating hole,
135: opening hole,
136: penetrating hole,
140: lower casing,
141: concave part,
141a: back clearance part,
142: flange,
143: penetrating hole,
144: step part,
145: bearing holder,
146: protruding part,
147: radial rib,
147a: triangle rib,
148: concentric rib,
149: resin pin,
149a: deformed top part,
151: stator core,
151a: salient pole,
152: slot,
153: penetrating hole,
154: penetrating hole,
161: connector housing,
162: connector pin,
163: cover,
171: ball bearing,
172: ball bearing,
173: shaft,
181: supply outlet,
191: upper insulator,
192: lower insulator,
193: coil,
194: resin pin,
194a: pin melt adhered part,
195: cylindrical part,
195a: slit (cut off),
196: extending part,
196a: concave part,
196b: protruding part.

What is claimed is:

1. A centrifugal fan comprising:
a resin upper casing,
a resin lower casing,
an impeller,
a motor, and
a circuit board,
wherein the impeller, the motor and the circuit board are housed between the resin upper casing and the resin lower casing,
ribs are formed at a bottom surface of the lower casing,
the lower casing includes primary pins for fixing the circuit board to the lower casing,
the primary pins are reinforced by the ribs,
the ribs include primary ribs extending along a radial direction and secondary ribs extending along a circumferential direction wherein the secondary ribs are concentrically arranged inside the lower casing, and
each of the primary pins is provided in a standing manner at a part where the primary ribs and the secondary ribs intersect to form rings of radially spaced primary pins that are concentrically arranged and the primary pins are configured to fix the circuit board to the lower casing.

2. The centrifugal fan according to claim 1, wherein the lower casing includes a circular protruding part reinforced by the primary ribs, and
a hollow cylindrical bearing holder, rotatably holding a shaft, which is a rotating axis of the impeller, is held in the circular protruding part.

3. The centrifugal fan according to claim 2, wherein each of the primary ribs has a connecting part connected to the circular protruding part, and the connecting part is substantially triangular in shape.

4. The centrifugal fan according to claim 3, wherein the substantially triangular shape part of the primary rib is at a position overlapping the circuit board viewed from a direction vertical to the axis.

5. The centrifugal fan according to claim 2, wherein a stator core is fixed to the bearing holder,
a resin insulator is attached to the stator core, and
the insulator includes secondary pins that penetrate the circuit board arranged between the lower casing and the stator core and the lower casing.

6. The centrifugal fan according to claim 5, wherein the secondary pins penetrate the circuit board at a position closer to an axis center than the primary pins, and
the primary pins penetrate the circuit board at a position closer to an outer edge than the secondary pins.

7. The centrifugal fan according to claim 5, wherein the insulator includes a cylindrical part extending to a direction of the lower casing, and
slits into which the primary ribs are inserted are formed at the cylindrical part.

8. The centrifugal fan according to claim 2, wherein a stator core is fixed to the bearing holder,
a resin insulator is attached to the stator core, the insulator includes concave parts at a top thereof and extending parts extending to a direction of the lower casing, and
a top of the extending part contacts a part which sandwiches a part in which the primary pin in the circuit board penetrates.

9. The centrifugal fan according to claim 8, wherein the insulator includes a cylindrical part extending to a direction of the lower casing, and
slits into which the primary ribs are inserted are formed at the cylindrical part.

10. The centrifugal fan according to claim 1, wherein coil terminal insert holes, into which terminals of winding wires of a coil of the motor are inserted, are arranged in the circuit board,
a penetrating hole is formed in the lower casing at a part facing the coil terminal insert hole, and
the terminals of the coil are connected to the circuit board inside the penetrating hole by soldering.

11. The centrifugal fan according to claim 1, wherein the lower casing includes a connector housing which is a part of the lower casing.

12. The centrifugal fan according to claim 1, wherein the upper casing includes supporting pillars extending to a direction of the lower casing, and a top of the supporting pillars is melt adhered to the lower casing in a manner penetrating a penetrating hole arranged through the lower casing.

13. A centrifugal fan comprising:
a resin upper casing,
a resin lower casing,
an impeller,
a motor, and
a circuit board,
wherein the impeller, the motor and the circuit board are housed between the resin upper casing and the resin lower casing,
ribs are formed at a bottom surface of the lower casing,
the ribs include primary ribs extending along a radial direction and secondary ribs extending along a circumferential direction wherein the secondary ribs are concentrically arranged inside the lower casing,
the lower casing includes a circular protruding part reinforced by the primary ribs,
a hollow cylindrical bearing holder, rotatably holding a shaft, which is a rotating axis of the impeller, is held in the circular protruding part,
each of the primary ribs has a connecting part connected to the circular protruding part, and the connecting part is substantially triangular in shape, and
each of the primary pins is provided in a standing manner at a part where the primary ribs and the secondary ribs intersect to form rings of radially spaced primary pins that are concentrically arranged and the primary pins are configured to fix the circuit board to the lower casing.

14. The centrifugal fan according to claim 13, wherein a stator core is fixed to the bearing holder, a resin insulator is attached to the stator core, the insulator includes a cylindrical part extending to a direction of the lower casing and slits provided on the cylindrical part, and the connecting part is engaged with the slits.

15. The centrifugal fan according to claim 13, wherein a stator core is fixed to the bearing holder, a resin insulator is attached to the stator core, and the insulator includes secondary pins that penetrate the circuit board arranged between the lower casing and the stator core and the lower casing.

16. The centrifugal fan according to claim 13, wherein the lower casing includes a connector housing which is a part of the lower casing.

* * * * *